United States Patent
Duron (10) Patent No.: US 9,443,121 B2
(45) Date of Patent: Sep. 13, 2016

(54) LOCALLY-POWERED, POLARIZATION-INSENSITIVE ANTENNA FOR RFID READER, AND RFID SYSTEM FOR, AND METHOD OF, SCANNING ITEM TAGS WITH ONE OR MORE SUCH ANTENNAS

(71) Applicant: SYMBOL TECHNOLOGIES, INC., Schaumburg, IL (US)

(72) Inventor: Mark W. Duron, East Patchogue, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 20 days.

(21) Appl. No.: 14/230,182

(22) Filed: Mar. 31, 2014

(65) Prior Publication Data

US 2015/0278563 A1    Oct. 1, 2015

(51) Int. Cl.
| | | |
|---|---|---|
| H04Q 5/22 | (2006.01) | |
| G06K 7/10 | (2006.01) | |
| H01Q 1/22 | (2006.01) | |
| H01Q 21/26 | (2006.01) | |

(52) U.S. Cl.
CPC ........ G06K 7/10316 (2013.01); G06K 7/10415 (2013.01); H01Q 1/2216 (2013.01); H01Q 21/26 (2013.01)

(58) Field of Classification Search
CPC ............... G06K 7/10316; G06K 7/10415; H01Q 1/2216; H01Q 21/26
USPC ....................................... 340/10.1
See application file for complete search history.

(56) References Cited

U.S. PATENT DOCUMENTS

| | | | |
|---|---|---|---|
| 7,515,051 | B2 | 4/2009 | Wagner et al. |
| 7,932,867 | B2 | 4/2011 | Tuttle |
| 8,242,909 | B2 | 8/2012 | Bellows et al. |
| 8,531,271 | B2 | 9/2013 | Tanaka |
| 2005/0280539 | A1 | 12/2005 | Pettus |
| 2006/0145926 | A1 | 7/2006 | Choi et al. |
| 2006/0220870 | A1 | 10/2006 | Kimura |
| 2007/0194929 | A1* | 8/2007 | Wagner ............. G06K 7/10346 340/572.7 |
| 2007/0279192 | A1 | 12/2007 | Tanaka |
| 2008/0042846 | A1 | 2/2008 | Jenkins et al. |
| 2008/0106378 | A1 | 5/2008 | Shanks |

(Continued)

FOREIGN PATENT DOCUMENTS

| | | |
|---|---|---|
| KR | 20090100652 A | 9/2009 |
| WO | 2007104339 A1 | 9/2007 |

OTHER PUBLICATIONS

International Search Report and Written Opinion mailed Jun. 29, 2015 in counterpart PCT application PCT/US2015/020482.

*Primary Examiner* — Hai Phan
*Assistant Examiner* — Zhen Y Wu (57) ABSTRACT

A reader antenna for a radio frequency (RF) identification (RFID) reader operative for scanning RFID item tags that are oriented at different orientations and that are associated with items contained in a controlled area, includes a pair of mutually orthogonal dipoles for radiating electromagnetic waves with mutually orthogonal polarizations, an electrically energizable RF switch for switching between the dipoles, and an RFID antenna tag mounted adjacent the dipoles, and operative for receiving the radiated wave from either dipole, for locally generating electrical power to supply power to the RF switch, and for energizing the RF switch to switch between the dipoles.

20 Claims, 5 Drawing Sheets

(56) References Cited

U.S. PATENT DOCUMENTS

| | | | | |
|---|---|---|---|---|
| 2008/0266192 A1* | 10/2008 | Tuttle | ................... | H01Q 1/2216 343/756 |
| 2009/0027162 A1 | 1/2009 | Forster | | |
| 2009/0224884 A1* | 9/2009 | Tuttle | ................... | G06K 7/0008 340/10.1 |
| 2009/0284377 A1* | 11/2009 | Tuttle | .............. | G06K 19/07749 340/572.7 |
| 2009/0295567 A1 | 12/2009 | Bellows | | |
| 2010/0201520 A1* | 8/2010 | Stern | ..................... | G01S 13/878 340/572.1 |
| 2010/0328038 A1* | 12/2010 | Kato | ................... | G06K 7/10356 340/10.1 |
| 2011/0068925 A1* | 3/2011 | Burnside | .............. | G06K 7/0008 340/572.7 |
| 2011/0250841 A1* | 10/2011 | Hulvey | ................ | H04B 5/0062 455/41.1 |
| 2012/0075080 A1 | 3/2012 | Ohuchi | | |
| 2012/0248187 A1 | 10/2012 | Piazza et al. | | |
| 2013/0093572 A1 | 4/2013 | Bloy et al. | | |
| 2013/0229262 A1 | 9/2013 | Bellows | | |

\* cited by examiner

LOCALLY-POWERED, POLARIZATION-INSENSITIVE ANTENNA FOR RFID READER, AND RFID SYSTEM FOR, AND METHOD OF, SCANNING ITEM TAGS WITH ONE OR MORE SUCH ANTENNAS

BACKGROUND OF THE INVENTION

The present disclosure relates generally to a polarization-insensitive antenna for a radio frequency (RF) identification (RFID) reader operative for transmitting or receiving electromagnetic waves in mutually orthogonal polarization planes, and to an RFID system for, and a method of, scanning item tags oriented at different orientations and associated with items contained in a controlled area, advantageously for inventory control of the RFID-tagged items, by using one or more such antennas.

RFID systems are well known and are commonly utilized for item tracking, item identification, and inventory control in manufacturing, warehouse, and retail environments. Briefly, an RFID system includes two primary constituents: a reader (also known as an interrogator), and a tag (also known as a transponder). The RFID system may have multiple readers, and multiple tags may be read by each reader. Each tag is a miniature device attached or associated with an item to be monitored, or with a package for the item, or with a container for multiple items, and typically includes an item tag antenna, a power management component, a radio or transceiver component, a microprocessor, and a memory. Each item tag is capable of responding, via its item tag antenna, to an electromagnetic wave, i.e., an RF interrogating signal, wirelessly radiated by a reader antenna of the reader. Some item tags are deemed active, because they contain their own battery power source. Other item tags do not contain their own power source and are deemed passive. Each passive tag receives the radiated wave, and its power management component locally generates a direct current (DC) voltage that is used to power all the electrical components on the item tag. Each item tag responsively modulates the interrogating signal, and generates and wirelessly radiates a return electromagnetic wave, i.e., an RF information response signal, back to the reader in a backscatter process. The return information response signal is modulated in a manner that conveys identification data (also known as a payload) from each item tag back to the reader. The identification data can then be demodulated, decoded, stored, processed, displayed, or transmitted by the reader as needed. The identification data can denote a serial number, a price, a date, a destination, a true bearing, other attribute(s), or any combination of attributes, and so on.

The RFID system is often used in an inventory monitoring and tracking application. For example, in order to take inventory of RFID-tagged items in a retail store, it is known to fixedly position at least one stationary RFID reader either overhead in a controlled area or inventory location, or at doorways, loading docks, and assembly lines, and then, to operate each such stationary reader to automatically read whatever tags are in the coverage range of each reader. For superior RF coverage, it is known to provide each stationary reader with multiple reader antennas that radiate a multitude of scan beams that are steered both in azimuth, over an angle of 360 degrees around a vertical axis, and in elevation, over an angle of about 180 degrees away from the vertical axis.

A conventional item tag antenna is typically a dipole, which radiates an electromagnetic wave entirely in one plane of polarization, e.g., either in a horizontal plane (horizontal polarization), or in a vertical plane (vertical polarization). Thus, the item tag antenna is polarized in only one direction or plane: vertical or horizontal. To obtain the best reading performance, the reader antenna and the item tag antenna should be matched in polarization. However, the orientation of the tags in the controlled area is typically unknown. Therefore, a horizontally polarized reader antenna is unable to accurately and quickly read an item tag with a vertically polarized item tag antenna. Likewise, a vertically polarized reader antenna is unable to accurately and quickly read an item tag with a horizontally polarized item tag antenna.

The art has proposed various RFID reader antenna designs, such as a circularly polarized patch antenna that simultaneously radiates electromagnetic waves in mutually orthogonal polarizations to obtain polarization insensitivity, but at a cost in antenna gain of at least about 3 dB as compared to a linearly polarized dipole antenna. This results in half as much power radiated in each polarization. Although the gain could be increased, the resulting radiation pattern of the circularly polarized antenna is narrower as compared to the linearly polarized dipole antenna. In addition, the circularly polarized antenna is more prone to multipath reflections and path-induced losses, with concomitant unpredictable changes in the polarization angle at each reflection, as compared to the linearly polarized dipole antenna.

The art has further proposed a switched cross-polarized antenna comprising a horizontally-oriented dipole with a horizontal polarization, a vertically-oriented dipole with a vertical polarization, and a powered switch for sequentially switching between the dipoles and the horizontal and vertical polarizations. Such a switched antenna has full power radiated in each polarization, a broader radiation pattern, and little or no change in the polarization angle in a multipath environment. However, as advantageous as such a switched antenna has been, an extra DC power cable needs to be routed between a DC power source in the reader and the powered switch in the switched antenna. When there are multiple antennas for each reader as described above, there is a corresponding number of extra DC power cables, one for each reader antenna, that are required to be deployed. Depending on the venue and/or whether the RFID system is being installed in an existing venue, it may be difficult, expensive, and unaesthetic to install and run these extra DC power cables. Rather than routing extra DC power cables, the art has also proposed running DC power along the RF cable between the reader and each antenna. This requires DC couplers and decouplers at the reader and each antenna. In other words, the reader and each antenna are matched in a customized design, which is difficult to retrofit without changing the reader and the matched antennas.

Accordingly, there remains a need for a polarization-insensitive, less costly, easy-to-install, and unobtrusive, reader antenna that is suitable for an RFID reader, without requiring the deployment of extra DC power cables, or the complete retrofit of the reader and each matched antenna, for use in an RFID system for, and a method of, scanning RFID item tags oriented at various orientations and associated with items located in a controlled area, especially for inventory control of the RFID-tagged items.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The method and structural components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to an antenna, especially beneficial for use with a radio frequency (RF) identification (RFID) reader for scanning RFID item tags that are oriented in different orientations (e.g., vertical, horizontal, or slanted) and that are associated with items contained in a controlled area. The antenna includes an RF signal feeding port for supplying an RF signal in an operating band of frequencies. Advantageously, in the case of an RFID reader, the operating band of frequencies lies in a frequency range on the order of 902-928 MHz. This designated range is not intended to limit the invention disclosed herein, because other frequency ranges are also contemplated. For example, in Europe, the operating band of frequencies for an RFID reader lies in a frequency range on the order of 865-868 MHz.

The antenna further includes a pair of crossed dipoles, i.e., a first dipole spatially oriented along a first direction, e.g., horizontal, and operatively connected to the port for radiating an electromagnetic wave from the RF signal with a first polarization, e.g., horizontal, and a second dipole spatially oriented along a second direction, e.g., vertical, generally orthogonal to the first direction and operatively connected to the port for radiating an electromagnetic wave from the RF signal with a second polarization, e.g., vertical, generally orthogonal to the first polarization. An electrically energizable RF switch is operative for switching the RF signal to the first dipole in a first switching state, and to the second dipole in a second switching state. An RFID antenna tag is mounted adjacent the dipoles and is spatially oriented along a third direction that is inclined relative to the first and second directions, e.g., at an angle of inclination on the order of 45 degrees with respect to the first and second directions. The antenna tag is operatively connected to the RF switch and is operative for receiving the radiated wave from either dipole, for locally generating electrical power to supply power to the RF switch, and for electrically energizing the RF switch to switch between the switching states. Preferably, the antenna tag is operative for locally generating the electrical power as a direct current (DC) voltage to supply power to the RF switch, and for sending a polarization control signal to the RF switch to command the RF switch to switch between the switching states.

Thus, the reader is enabled to read any item tag, no matter its orientation, because the dipoles sequentially radiate waves with mutually orthogonal polarizations. Such a switched antenna has full power radiated in each polarization, a broad radiation pattern, and little or no change in the polarization angle in a multipath environment. In contrast to the prior art, as described above, an extra DC power cable between a power source in the reader and the RF switch has been eliminated, because the antenna tag now provides the power to operate the RF switch. In an RFID system in which there are multiple antennas for each reader as described above, the prior art requirement to deploy a corresponding number of extra DC power cables, one for each reader antenna, is no longer required. Also, it is no longer required to change the reader and all the antennas in a customized, matched system where the DC is run over the RF cable. This is of especial benefit in a retrofit of an existing installation, where it may be difficult, expensive, and unaesthetic to install and run these extra DC power cables, or to replace the reader and all the matched antennas.

In accordance with another aspect of this disclosure, a method of scanning radio frequency (RF) identification (RFID) item tags that are oriented at different orientations and that are associated with items contained in a controlled area, is performed by operatively connecting a plurality of reader antennas to an RFID reader in the controlled area, supplying an RF signal in an operating band of frequencies to each antenna from an RF signal feeding port of each antenna, spatially orienting a first dipole of each antenna along a first direction, operatively connecting each first dipole to the port of each antenna for radiating an electromagnetic wave from the RF signal with a first polarization, spatially orienting a second dipole of each antenna along a second direction, operatively connecting each second dipole to the port of each antenna for radiating an electromagnetic wave from the RF signal with a second polarization, configuring the first and second directions to be generally mutually orthogonal, configuring the first and second polarizations to be generally mutually orthogonal, switching the RF signal to the first dipole of each antenna in a first switching state of an electrically energizable RF switch for each antenna, and to the second dipole of each antenna in a second switching state of the RF switch, mounting an RFID antenna tag adjacent the dipoles of each antenna, spatially orienting each antenna tag along a third direction that is inclined relative to the first and second directions of each antenna, operatively connecting each antenna tag to the respective RF switch, receiving the radiated wave from either dipole of each antenna, locally generating electrical power at each antenna tag to supply power to the respective RF switch, and electrically energizing the respective RF switch, via each antenna tag, to switch between the switching states.

Figure 1:
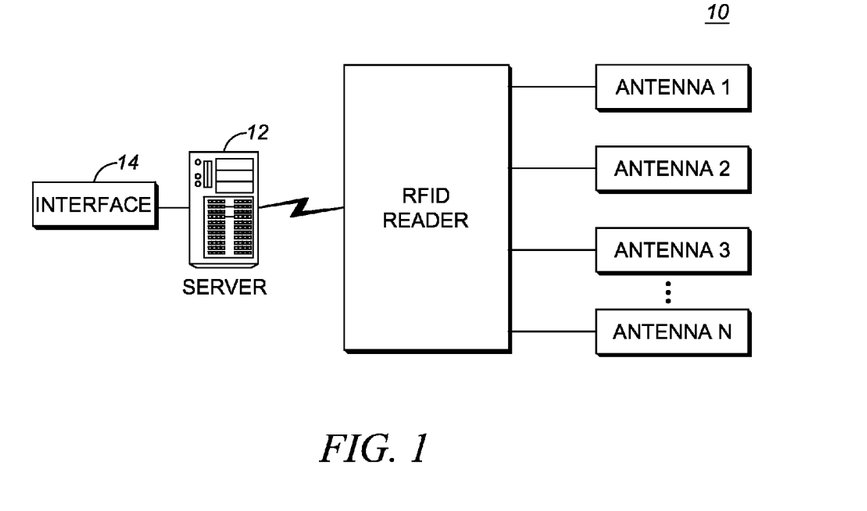
FIG. 1 is a schematic view of an exemplary radio frequency identification (RFID) tag reader having an array of reader antennas, each configured in accordance with the present disclosure.

Turning now to the drawings, FIG. 1 depicts a simplified depiction of a radio frequency identification (RFID) tag reader 10 having one or more reader antennas 1, 2, 3 . . . , N. The reader 10 is connected to a server or controller 12 and a user interface 14. The reader 10, also known as an RFID interrogator or scanner, has an RF transceiver, and the reader antennas 1, 2, 3, . . . , N radiate a multitude of beams or RF electromagnetic waves generated by the transceiver over a coverage range in which RFID-tagged items, e.g., handbags 104, and clothing 106, as well as other items, as depicted in a retail venue depicted in FIG. 2, can be read. The number of the antennas may be any integer number, N. In one advantageous embodiment, the reader 10 has eight antennas.

The controller 12 comprises one or more computers or servers that is in wired, wireless, direct, or networked communication with the interface 14 and with the reader 10. The interface 14 provides a human/machine interface, e.g., a graphical user interface (GUI), that presents information in pictorial and/or textual form (e.g., representations of locations of the reader 10 and the RFID-tagged items 104, 106) to a human user, and to initiate and/or alter the execution of various processes that may be performed by the controller 12. The controller 12 and the interface 14 may be separate hardware devices and include, for example, a computer, a monitor, a keyboard, a mouse, a printer, and various other hardware peripherals, or may be integrated into a single hardware device, such as a mobile smartphone, or a portable tablet, or a laptop computer. Furthermore, the user interface 14 can be in a smartphone, or tablet, etc., while the controller 12 may be a computer, either located at a controlled area 102 (see FIG. 2) containing the RFID-tagged items 104, 106, or remotely at some other location, or can be hosted in a cloud server. The controller 12 advantageously includes a wireless RF transceiver that communicates with the reader 10. For example, Wi-Fi and Bluetooth® are open wireless standards for exchanging data between electronic devices.

Figure 2:
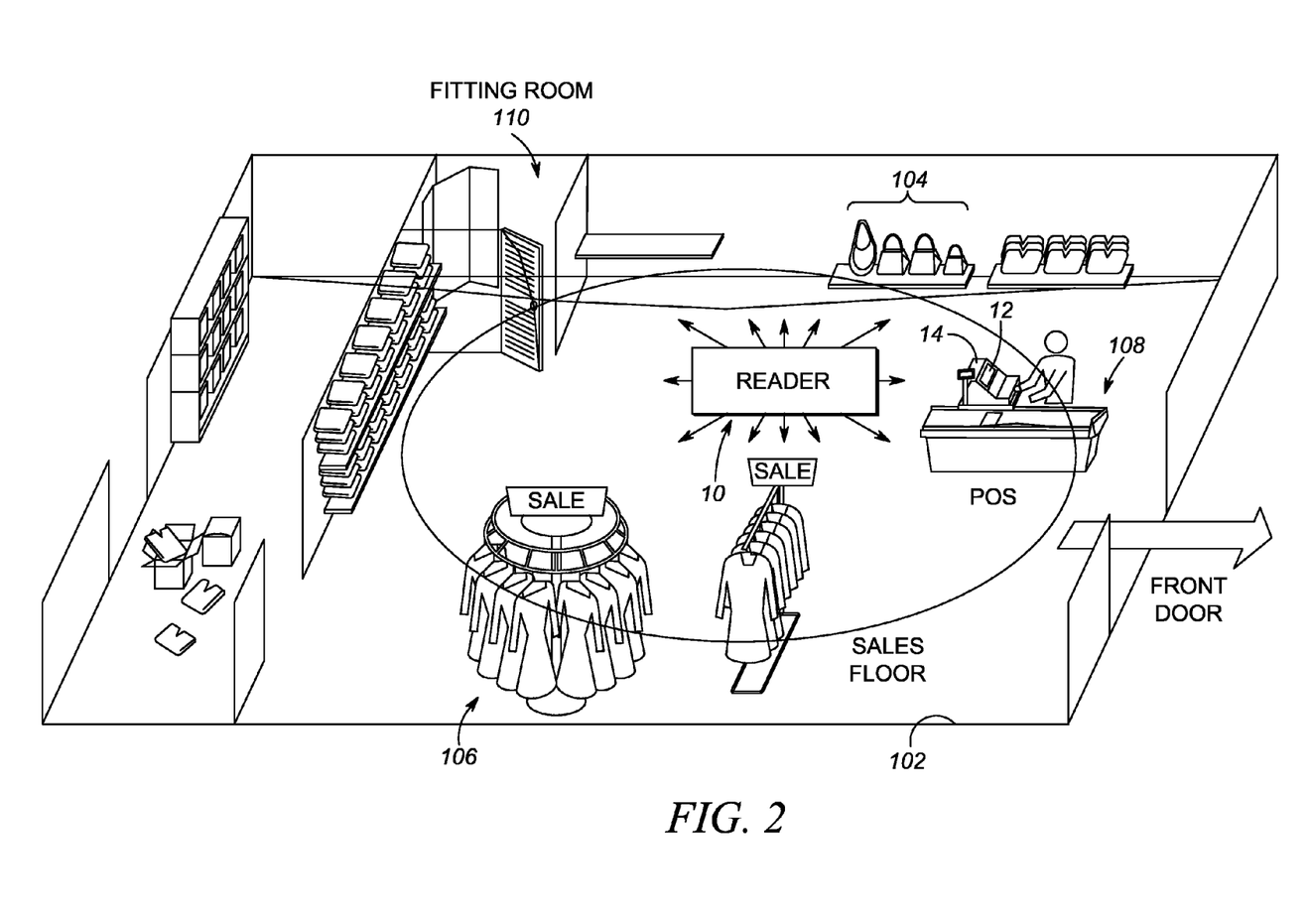
FIG. 2 is a perspective, schematic view of a retail venue having RFID-tagged items that are read by operating the reader of FIG. 1.

FIG. 2 depicts an exemplary depiction of the reader 10 deployed in a controlled area or inventory location 102 of a retail sales floor having a point-of-sale (POS) or checkout station 108 at which the controller 12 and the interface 14 may be provided, a fitting room 110, and a plurality of RFID-tagged items 104, 106, e.g., clothes, handbags, etc., arranged on shelves, hangers, racks, on the floor, etc. Each RFID-tagged item 104, 106 is preferably associated with a passive item tag for cost reasons. Briefly stated, each item tag for the items 104, 106 conventionally includes, without limitation: an item tag antenna, a power management component, a radio or transceiver component, a microprocessor, and a memory. To simplify the drawing, only one reader 10 has been illustrated as being preferably located overhead on the ceiling in the controlled area 102. More than one reader 10 to extend the coverage range could be deployed, and not necessarily on the ceiling. The reader 10 may be powered from an electrical outlet, powered over the Ethernet (POE), or can be battery powered.

The scan beams radiated from the reader 10, as indicated by arrows extending outwardly therefrom, extend both in azimuth over an angular range of 360 degrees around a vertical axis or plumb line, and in elevation over an angular spread of about 180 degrees away from the axis. In the exemplary application described herein, each reader antenna is designed to operate in the UHF frequency band designated for RFID systems. Alternate embodiments may instead utilize the high frequency band, or the low frequency band, designated for RFID systems. For example, in the United States, RFID systems may utilize the 902-928 MHz frequency band, and in Europe, RFID systems may utilize the 865-868 MHz frequency band. Each reader antenna can be designed, configured, and tuned to accommodate the particular operating frequency band of the host RFID reader 10. In addition, the reader antenna described herein can also be used in non-RFID applications.

Since the orientation of the item tags and their tag antennas in the controlled area 102 is typically unknown, one aspect of this invention is to make each reader antenna relatively less sensitive to the polarization of the item tags being interrogated, without sacrificing good reading performance. The reader antenna design of this invention can accommodate the packaging requirements and configuration of existing RFID readers and/or can readily accommodate new readers. For the sake of brevity, conventional techniques related to RFID data transmission, RFID system architecture, RF signal processing, and other functional aspects of RFID systems (and the individual operating components of such systems) may not be described in detail herein.

Briefly stated, the RFID reader 10 conventionally includes, without limitation: an RF communication module coupled to, and driving, each reader antenna; a power supply; a processor; and a memory. The various operating components of the reader 10 are coupled together as needed to facilitate the delivery of operating power from the power supply, the transfer of data, the transfer of control signals and commands, and the like. The processor may be any general purpose microprocessor, controller, or microcontroller that is suitably configured to control the operation of the reader. In practice, the processor may execute one or more software applications that provide the desired functionality for the reader. The memory is capable of storing application software utilized by the processor and/or data captured by the reader during operation. The RF communication module is suitably configured to process RF signals associated with the operation of the reader, and to otherwise support the RFID functions of the reader. The communication module includes a transceiver that radiates an electromagnetic wave or interrogation signal to each item tag antenna, and that receives a return electromagnetic wave radiated by each item tag antenna in response to the interrogation signal. Each reader antenna is coupled to the RF communication module using RF transmission lines or RF coaxial cables in combination with suitable RF connectors, plugs, nodes, or terminals on the communication module and/or on the reader antenna.

Figure 3:
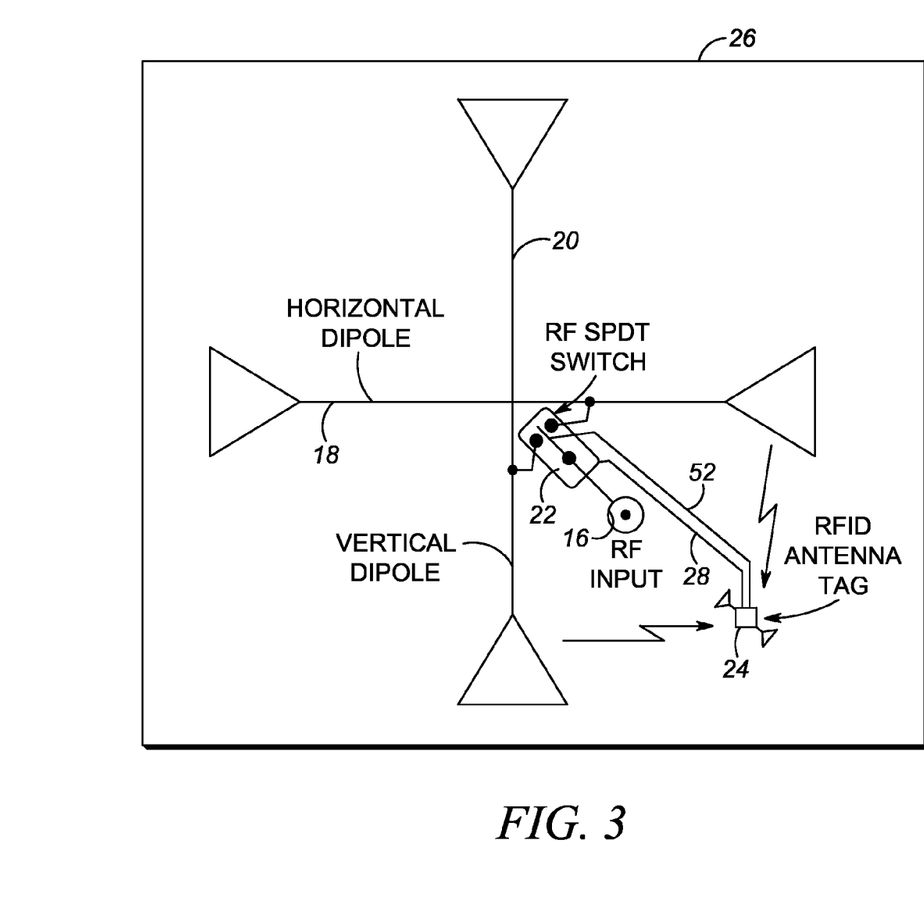
FIG. 3 is a schematic of each reader antenna of FIG. 1.

In accordance with this disclosure, each reader antenna is configured, as depicted in FIG. 3, with an RF signal feeding port 16 for supplying an RF signal from the reader 10 in an operating band of frequencies; a pair of crossed, first and second dipoles 18, 20; an electrically energizable RF switch 22; and an RFID antenna tag 24, all preferably mounted on a common support 26. The first dipole 18 is spatially oriented along a first direction, e.g., horizontal, and is operatively connected to the port 16 through the RF switch 22 for radiating an electromagnetic wave from the RF signal with a first polarization, e.g., horizontal. The second dipole 20 is spatially oriented along a second direction, e.g., vertical, that is generally orthogonal to the first direction, and is operatively connected to the port 16 through the RF switch 22 for radiating an electromagnetic wave from the RF signal with a second polarization, e.g., vertical, that is generally orthogonal to the first polarization.

The RF switch 22 is operative, when powered by the antenna tag 24 over a power line 28, and when energized by the antenna tag 24 over a control line 52, as described below, for sequentially switching the RF signal to the first dipole 18 in a first switching state, and to the second dipole 20 in a second switching state. As shown, the RF switch 22 is a single pole, double throw switch, although other switch configurations could also be used. The RFID antenna tag 24 is mounted adjacent the dipoles 18, 20 on the support 26 and is spatially oriented along a third direction that is inclined relative to the first and second directions, e.g., at an angle of inclination on the order of 45 degrees with respect to the first and second directions. The RFID antenna tag 24 is analogous in structure and function to the above-described RFID item tag in that the antenna tag 24 has an antenna tag antenna, a power management component, a radio or transceiver component, a microprocessor, and a memory, as described below in connection with FIG. 4. This insures that the antenna tag 24 remains powered and energized regardless of the polarization of the dipoles. The antenna tag 24 is operatively connected to the RF switch 22, and is operative for receiving the radiated wave from either dipole 18, 20, for locally generating electrical power to supply power to the RF switch 22, and for electrically energizing the RF switch 22 to switch between the switching states. Preferably, the antenna tag 24 is operative for locally generating the electrical power as a direct current (DC) voltage to supply power to the RF switch 22 over the power line 28, and for sending a polarization control signal to the RF switch 22 over the power line 52 to command the RF switch 22 to sequentially switch between the switching states.

Figure 4:
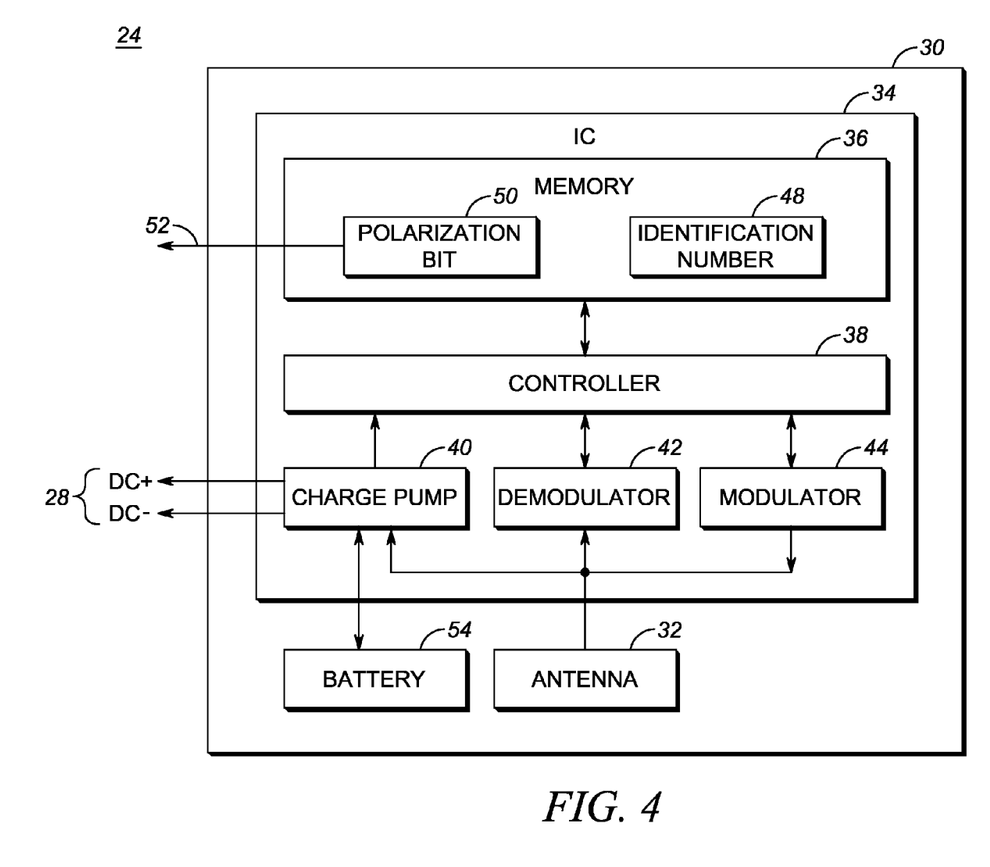
FIG. 4 is a block diagram depicting components of an antenna tag for each reader antenna of FIG. 1.

More particularly, the RFID antenna tag 24 of FIG. 4 includes a substrate 30, an antenna 32, and an integrated circuit (IC) 34. Antenna 32 is formed on a surface of substrate 30 and may include any number of one, two, or more separate antennas of any suitable antenna type, including dipole, loop, slot, or patch antenna type. IC 34 controls operation of the antenna tag 24, and transmits signals to, and receives signals from the RFID reader 10 using antenna 32. IC 34 includes a memory 36, a controller 38, a charge pump 40, a demodulator 42, and a modulator 44. The charge pump 40, the demodulator 314, and the modulator 316 are coupled to the antenna 32 and to the controller 38. Memory 36 stores data, including an identification number 48 and a polarization bit 50. Identification number 48 typically is a unique identifier (at least in a local environment) for the antenna tag 24. For instance, when the antenna tag 24 is interrogated by the reader 10 in a setup mode of operation, the antenna tag 24 may respond with the stored identification number 48 to identify itself. The polarization bit 50 can be a logical "1" or a logical "0" to indicate horizontal or vertical polarization, respectively, in response to a reader interrogation. The reader 10 can remotely command the polarization bit 50 to be either horizontal or vertical via the EPC Link Layer Reader Protocol (LLRP) as a select data write command. A polarization control signal indicative of the polarization bit 50 is output over the control line 52 that connects the antenna tag 24 to the RF switch 22. For example, the polarization control signal can have a high voltage level indicative of the first polarization, and a low voltage level indicative of the second polarization, or vice versa.

Charge pump 40 receives the RF wave radiated by either dipole 18 or 20 from antenna 32, and generates plus and minus direct current (DC) voltage levels that is used not only to power all the electrical components on the antenna tag 24, but also to power the RF switch 22 over the power line 28. The charge pump 40 rectifies the received RF wave to create the voltage levels and increases the created voltage levels to a level sufficient to power the electrical components and the RF switch 22. Charge pump 40 may also include a regulator to stabilize the voltage level. Charge pump 40 may be configured in any suitable way known to persons skilled in the relevant art. Alternative circuits for generating power in the antenna tag 24 are also applicable to embodiments of the present invention. Charge pump 40 may also include a battery 54, which can be used to power the antenna tag 24 and the RF switch 22 during low RF power states that may not be able to fully power the antenna tag 24 and the RF switch 22. At high RF power states, excess charge from the charge pump 40 can be stored in the battery 54 for later use.

Since the antenna tag 24 now provides local power to operate the RF switch 22, there is no longer any need to route an extra DC power cable between a power source in the reader 10 and the RF switch 22, or to completely replace a customized reader and its matched antennas. In an RFID system in which there are multiple antennas for each reader 10 as described above, the prior art requirement to deploy a corresponding number of extra DC power cables, one for each reader antenna, is no longer required. This is of especial benefit in a retrofit of an existing installation, where it may be difficult, expensive, and unaesthetic to install and run these extra DC power cables. The reader 10 is enabled to read any item tag, no matter its orientation, because the dipoles 18, 20 sequentially radiate waves with mutually orthogonal polarizations. Such a switched antenna has full power radiated in each polarization, a broad radiation pattern, and little or no change in the polarization angle in a multipath environment.

Figure 5:
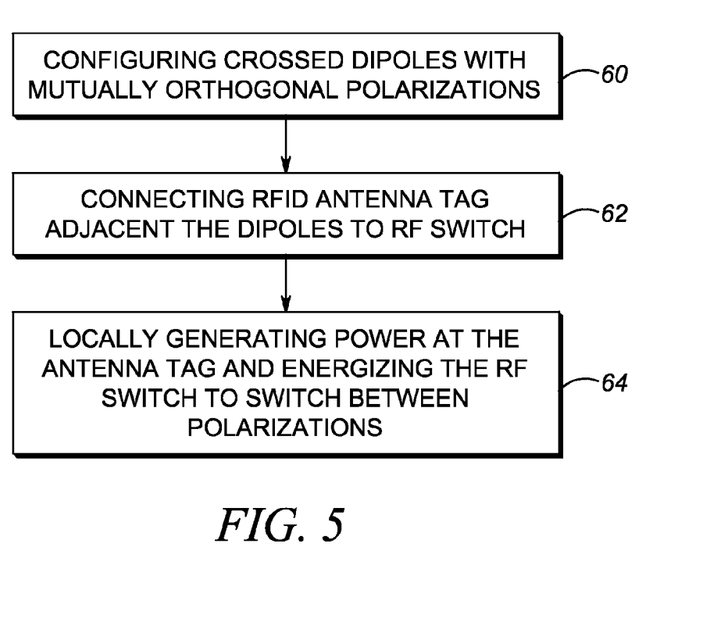
FIG. 5 is a flow chart depicting steps performed in accordance with the present disclosure.

The flow chart of FIG. 5 depicts the steps performed in scanning the item tags that are oriented at different orientations and that are associated with items 104, 106 contained in the controlled area 102. Step 60 configures the crossed dipoles 18, 20 with generally mutually orthogonal polarizations by spatially orienting the first dipole 18 along a first direction and to radiate an electromagnetic wave with a first polarization, and by spatially orienting the second dipole 20 along a second direction and to radiate an electromagnetic wave with a second polarization. Step 62 connects the antenna tag 24 to the RF switch 22 by mounting the antenna tag 24 adjacent the dipoles 18, 20 at an angle of inclination inclined relative to the first and second directions. Step 64 locally generates electrical power at the antenna tag 24 by receiving the radiated wave from either dipole 18, 20 to supply power to the RF switch 22, and energizes the RF switch to sequentially switch between the first dipole 18 in a first switching state and the second dipole 20 in a second switching state. By sequentially switching between the dipoles 18, 20, their respective polarizations are also generated, thereby enabling the tags to be read, no matter their orientation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A reader antenna for a radio frequency (RF) identification (RFID) reader operative for scanning RFID item tags that are oriented at different orientations and that are associated with items contained in a controlled area, comprising:
   an RF signal feeding port for supplying an RF signal in an operating band of frequencies;
   a first dipole spatially oriented along a first direction, and operatively connected to the port for radiating an electromagnetic wave from the RF signal with a first polarization;
   a second dipole spatially oriented along a second direction, and operatively connected to the port for radiating an electromagnetic wave from the RF signal with a second polarization, the first and second directions being generally mutually orthogonal, and the first and second polarizations being generally mutually orthogonal;
   an electrically energizable RF switch for switching the RF signal to the first dipole in a first switching state, and to the second dipole in a second switching state; and
   an RFID antenna tag having an antenna therein spatially oriented along a third direction that is inclined relative to the first and second directions, the antenna tag having an integrated circuit (IC) therein operatively connected to the RF switch, and the antenna in the RFID antenna tag being mounted adjacent the dipoles and being operative for receiving the radiated wave from either dipole of the reader antenna, locally generating electrical power to supply power to the RF switch for electrically energizing the RF switch to switch between the first switching state with the first dipole of the reader antenna receiving the RF signal and the second switching state with the second dipole of the reader antenna receiving the RF signal.

2. The reader antenna of claim 1, wherein each dipole is planar, and wherein the dipoles lie in a common plane.

3. The reader antenna of claim 1, wherein the operating band is in a frequency range on the order of 902-928 MHz.

4. The reader antenna of claim 1, wherein the antenna tag is inclined at an angle of inclination on the order of 45 degrees with respect to the first and second directions.

5. The reader antenna of claim 1, and a common support for supporting the dipoles and the antenna tag in a close relationship.

6. The reader antenna of claim 1, wherein the antenna tag is operative for locally generating the electrical power as a direct current (DC) voltage to send to the RF switch, and for sending a polarization control signal to the RF switch to command the RF switch to switch between the switching states.

7. The reader antenna of claim 6, wherein the antenna tag includes a tag memory containing polarization data, and a tag processor for accessing the memory to retrieve and send the polarization data as the polarization control signal to the RF switch.

8. A radio frequency (RF) identification (RFID) system for scanning RFID item tags that are oriented at different orientations and that are associated with items contained in a controlled area, comprising:
   an RFID reader in the controlled area; and a plurality of reader antennas operatively connected to the reader, each antenna including an RF signal feeding port for supplying an RF signal in an operating band of frequencies, a first dipole spatially oriented along a first direction, and operatively connected to the port for radiating an electromagnetic wave from the RF signal with a first polarization, a second dipole spatially oriented along a second direction, and operatively connected to the port for radiating an electromagnetic wave from the RF signal with a second polarization, the first and second directions being generally mutually orthogonal, and the first and second polarizations being generally mutually orthogonal, an electrically energizable RF switch for switching the RF signal to the first dipole in a first switching state, and to the second dipole in a second switching state, and an RFID antenna tag having an antenna therein spatially oriented along a third direction that is inclined relative to the first and second directions, the antenna tag having an integrated circuit (IC) therein operatively connected to the RF switch, and the antenna in the RFID antenna tag being mounted adjacent the dipoles and being operative for receiving the radiated wave from either dipole of the reader antenna, for locally generating electrical power to supply power to the RF switch, and for electrically energizing the RF switch to switch between the first switching state with the first dipole of the reader antenna receiving the RF signal and the second switching state with the second dipole of the reader antenna receiving the RF signal.

9. The system of claim 8, wherein each dipole of each antenna is planar, and wherein the dipoles of each antenna lie in a common plane.

10. The system of claim 8, wherein the operating band of each antenna is in a frequency range on the order of 902-928 MHz.

11. The system of claim 8, wherein the antenna tag of each antenna is inclined at an angle of inclination on the order of 45 degrees with respect to the first and second directions of each antenna.

12. The system of claim 8, and a common support for each antenna for supporting the dipoles and the antenna tag in a close relationship.

13. The system of claim 8, wherein the antenna tag of each antenna is operative for locally generating the electrical power as a direct current (DC) voltage to send to the RF switch, and for sending a polarization control signal to the RF switch to command the RF switch to switch between the switching states.

14. The system of claim 13, wherein the antenna tag includes a tag memory containing polarization data, and a tag processor for accessing the memory to retrieve and send the polarization data as the polarization control signal to the RF switch.

15. A method of scanning radio frequency (RF) identification (RFID) item tags that are oriented at different orientations and that are associated with items contained in a controlled area, comprising:

operatively connecting a plurality of reader antennas to an RFID reader in the controlled area;
supplying an RF signal in an operating band of frequencies to each antenna from an RF signal feeding port of each antenna;
spatially orienting a first dipole of each antenna along a first direction;
operatively connecting each first dipole to the port of each antenna for radiating an electromagnetic wave from the RF signal with a first polarization;
spatially orienting a second dipole of each antenna along a second direction;
operatively connecting each second dipole to the port of each antenna for radiating an electromagnetic wave from the RF signal with a second polarization;
configuring the first and second directions to be generally mutually orthogonal;
configuring the first and second polarizations to be generally mutually orthogonal;
switching the RF signal to the first dipole of each antenna in a first switching state of an electrically energizable RF switch for each antenna, and to the second dipole of each antenna in a second switching state of the RF switch;
mounting an RFID antenna tag adjacent the dipoles of each antenna;
spatially orienting the antenna tag along a third direction that is inclined relative to the first and second directions of each reader antenna;
operatively connecting the antenna tag to the respective RF switch receiving the radiated wave from either dipole of each reader antenna;
locally generating electrical power at the antenna tag to supply power to the respective RF switch; and
electrically energizing the respective RF switch, via the antenna tag, to switch between the switching states.

16. The method of claim 15, and configuring each dipole of each antenna to be planar, and configuring the dipoles of each antenna to lie in a common plane.

17. The method of claim 15, and inclining the antenna tag of each antenna at an angle of inclination on the order of 45 degrees with respect to the first and second directions of each antenna.

18. The method of claim 15, and supporting the dipoles and the antenna tag of each antenna in a close relationship on a common support.

19. The method of claim 15, and locally generating the electrical power as a direct current (DC) voltage to send to the respective RF switch, and sending a polarization control signal to the respective RF switch to command the respective RF switch to switch between the switching states.

20. The method of claim 19, and storing polarization data in a tag memory on each antenna tag, and accessing the memory to retrieve and send the polarization data as the polarization control signal to the respective RF switch.

* * * * *